(12) United States Patent
Tahara et al.

(10) Patent No.: US 11,095,870 B1
(45) Date of Patent: Aug. 17, 2021

(54) CALIBRATION OF CAMERAS ON UNMANNED AERIAL VEHICLES USING HUMAN JOINTS

(71) Applicant: SONY CORPORATION, Tokyo (JP)

(72) Inventors: Daisuke Tahara, San Jose, CA (US); Alexander Berestov, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/856,511

(22) Filed: Apr. 23, 2020

(51) Int. Cl.
| | |
|---|---|
| *H04N 13/246* | (2018.01) |
| *G06T 7/80* | (2017.01) |
| *G06T 7/73* | (2017.01) |
| *B64C 39/02* | (2006.01) |
| *G06K 9/00* | (2006.01) |
| *G06N 3/08* | (2006.01) |
| *G06N 20/00* | (2019.01) |
| *G05D 1/10* | (2006.01) |

(52) U.S. Cl.
CPC ......... *H04N 13/246* (2018.05); *B64C 39/024* (2013.01); *G05D 1/104* (2013.01); *G06K 9/00335* (2013.01); *G06N 3/08* (2013.01); *G06N 20/00* (2019.01); *G06T 7/74* (2017.01); *G06T 7/85* (2017.01); *B64C 2201/127* (2013.01); *G06T 2207/30196* (2013.01)

(58) Field of Classification Search
CPC ........... H04N 13/246; G06T 7/74; G06T 7/85; G06T 2207/30196; G06N 20/00; G06N 3/08; B64C 39/024; B64C 2201/127; G05D 1/104; G06K 9/00335
See application file for complete search history.

(56) References Cited

U.S. PATENT DOCUMENTS

| | | | |
|---|---|---|---|
| 9,986,233 B1 * | 5/2018 | Curlander | ............ H04N 17/002 |
| 2011/0157373 A1 | 6/2011 | Ye et al. | |
| 2015/0256815 A1 | 9/2015 | Grafulla-Gonzalez | |

(Continued)

FOREIGN PATENT DOCUMENTS

EP    WO 2020/038720    *   2/2020

OTHER PUBLICATIONS

Takahashi, et al., "Human Pose as Calibration Pattern: 3D Human Pose Estimation with Multiple Unsynchronized and Uncalibrated Cameras", IEEE/CVF Conference on Computer Vision and Pattern Recognition Workshops (CVPRW), 2018, 08 pages.

*Primary Examiner* — Michael E Teitelbaum
(74) *Attorney, Agent, or Firm* — Chip Law Group (57) ABSTRACT

A system and method for calibration of cameras on Unmanned Aerial Vehicles (UAVs) is provided. The system receives a set of anchor images of a human subject from a set of anchor cameras and a group of images of the human subject from multiple viewpoints in three-dimensional (3D) space from a group of cameras on a group of UAVs. The system determines a first set of two-dimensional (2D) positions of human joints from the set of anchor images and a second set of 2D positions of the human joints from the group of images. The system computes, as 3D key-points, 3D positions of the human joints based on triangulation using the first set of 2D positions and determines a 2D re-projection error between the 3D key-points and the second set of 2D positions. Thereafter, by minimizing the 2D re-projection error, the system calibrates each camera of the group of cameras.

20 Claims, 7 Drawing Sheets

(56) References Cited

U.S. PATENT DOCUMENTS

| | | | | |
|---|---|---|---|---|
| 2016/0349746 A1* | 12/2016 | Grau | ................... | G05D 1/0094 |
| 2017/0220887 A1* | 8/2017 | Fathi | .................. | G06K 9/00208 |
| 2018/0186452 A1* | 7/2018 | Tian | ..................... | G06F 3/0304 |
| 2019/0258239 A1* | 8/2019 | Floreano | .............. | A61H 1/0274 |

* cited by examiner

CALIBRATION OF CAMERAS ON UNMANNED AERIAL VEHICLES USING HUMAN JOINTS

REFERENCE

None

FIELD

Various embodiments of the disclosure relate to camera calibration. More specifically, various embodiments of the disclosure relate to a system and method for calibration of cameras mounted on or integrated with unmanned aerial vehicles (UAVs) using human joints.

BACKGROUND

Various two-dimensional patterns, such as a checkerboard pattern, are used for camera calibration. Although, camera calibration by use of such patterns may result in accurate calibration results, these techniques may be time consuming and may additionally require a significant amount of manual effort. For example, the application of such camera calibration techniques may be prone to point-matching problem.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method for calibration of cameras mounted on or integrated with unmanned aerial vehicles (UAVs) using human joints is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed system and method for automated calibration of a group of cameras mounted on or integrated with Unmanned Aerial Vehicles (UAVs) using human joints. Exemplary aspects of the disclosure provide a set of anchor cameras which may be pre-calibrated and fixed at certain known positions and orientations in a 3D space. Further, a group of cameras may be mounted on or integrated with each UAV of a group of UAVs. The group of cameras may not be pre-calibrated for extrinsic camera parameters, such as, translation and rotation parameters. The set of anchor cameras and the group of UAVs may surround a human subject in a 3D space. A first set of two-dimensional (2D) positions of human joints may be determined from a set of anchor images of the human subject captured by the set of anchor cameras. Further, a second set of 2D positions of the human joints of the human subject may be determined from a group of images of the human subject captured by the group of cameras from multiple three-dimensional (3D) viewpoints. The system may compute 3D key-points as 3D positions of the human joints based on a triangulation of the determined first set of 2D positions and may calibrate each of the group of cameras (i.e. extrinsic and/or intrinsic parameters) with respect to the set of anchor cameras or a gauge) by minimizing a 2D re-projection error between the 3D key-points and the second set of 2D positions.

Use of human joints for camera calibration may be less prone to the point-matching problem, which typically occurs with conventional calibration methods that uses 2D patterns, such as a checkerboard. Also, the use of the human joints for calibration may remove a need for manually placing a calibration pattern, such as a checkerboard in front of an uncalibrated camera.

Figure 1:
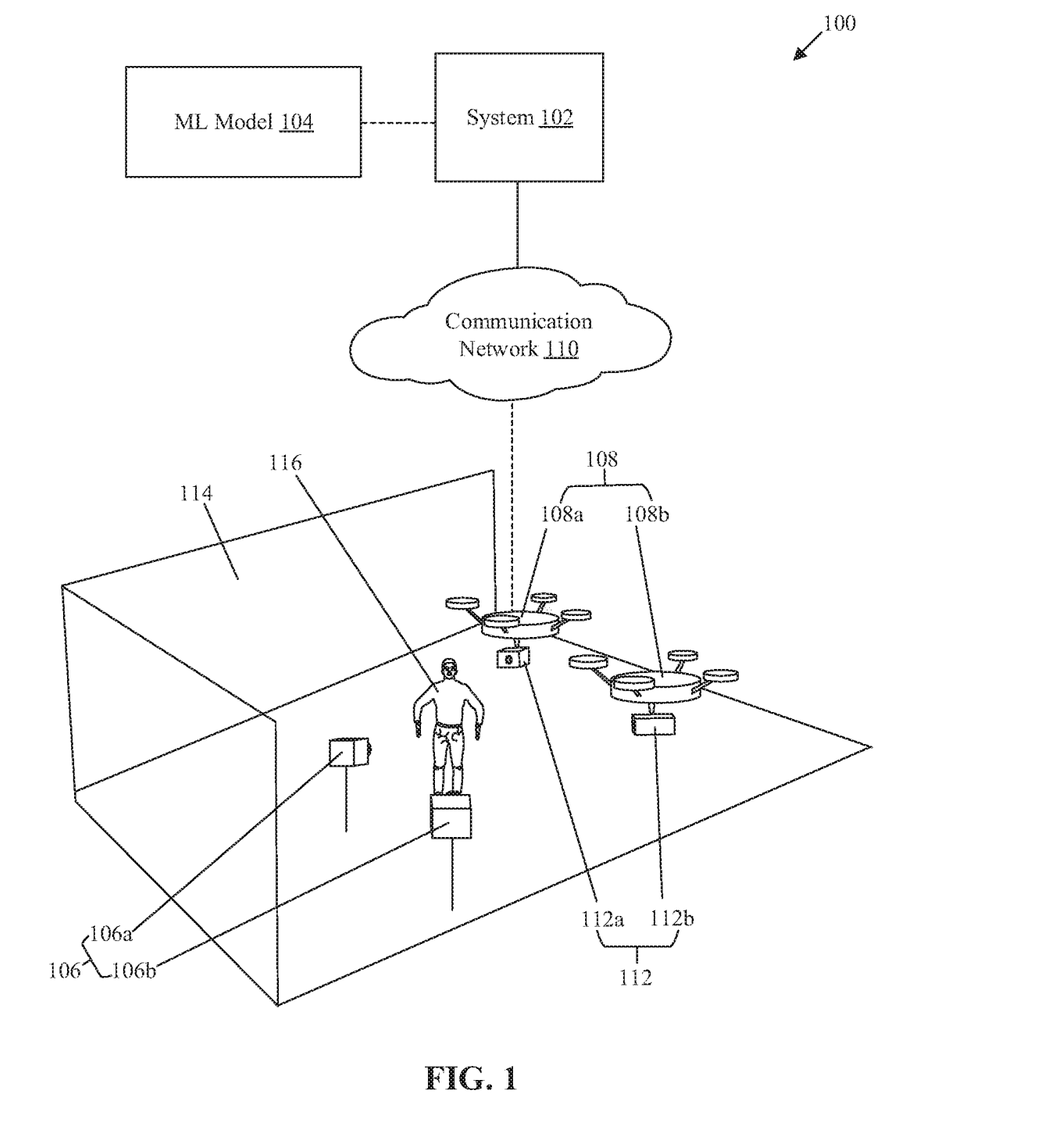
FIG. 1 is a block diagram that illustrates an exemplary network environment for calibration of a group of cameras mounted on or integrated with a group of UAVs by use of human joints, in accordance with an embodiment of the disclosure.

FIG. 1 is a block diagram that illustrates an exemplary network environment for calibration of a group of cameras mounted on or integrated with a group of UAVs by use of human joints, in accordance with an embodiment of the disclosure. With reference to FIG. 1, there is shown a network environment 100. The network environment 100 may include a system 102 and a machine learning (ML) model 104, which may be included in the system 102. The network environment 100 may further include a set of anchor camera devices 106, a group of UAVs 108, and a communication network 110. As shown, for example, the set of anchor camera devices 106 may include a first anchor camera device 106a and a second anchor camera device 106b. Similarly, the group of UAVs 108 may include a first UAV 108a and a second UAV 108b, both of which may be fitted with a camera, such as a first camera 112a for the first UAV 108a and a second camera 112b for the second UAV 108b. The first camera 112a and the second camera 112b may be collectively referred as a group of cameras 112. The system 102 may be communicatively coupled to the set of anchor camera devices 106 and the group of UAVs 108, via the communication network 110.

There is further shown a three-dimensional (3D) space 114, as part of a 3D environment, in which the set of anchor camera devices 106 and the group of UAVs 108 may be deployed. In the 3D space 114, there is also shown a human subject 116 surrounded by the set of anchor camera devices 106 and the group of UAVs 108. The set of anchor camera devices 106 and the group of UAVs 108 may be (e.g., sparsely) located at multiple viewpoints in the 3D space 114 and may collectively form a multi-scanner network having a combined Field-of-View (FoV) that may cover at least an anterior or a posterior side of the body of the human subject 116. The human subject 116 may be a part of the foreground of a scene, which may also include other objects, details and illustrations of which are omitted from the disclosure for the sake of brevity.

It should be noted that the position, orientation, arrangement, and number of the cameras associated with the set of anchor camera devices 106 and the group of UAVs 108 in FIG. 1 is merely presented as an example and should not be construed as limiting for the disclosure. The present disclosure may be also applicable to other positions, orientations, arrangements, and more or less numbers of anchor camera devices and UAVs, without deviating from scope of the disclosure.

The system 102 may include suitable logic, circuitry, interfaces, and/or code that may be configured to calibrate each camera mounted on or integrated with a respective UAV of the group of UAVs 108 by use of information associated with human joints of the human subject 116. Examples of implementation of the system 102 may include, but are not limited to, a video broadcasting system, an augmented reality-based device, a gaming device, a video processing device, a video editing system, a media production system, a computer workstation, a mainframe computer, a handheld computer, a mobile phone, a smart appliance, a video player, a digital camera, a video camera, a server, a consumer electronic (CE) device, and/or any other computing device with image processing capability.

The ML model 104 may correspond to a human joint detection framework, such as, a neural network that may be trained on a 2D human joint detection task. For example, the ML model 104 may include a trained neural network, which may receive an image of the human subject 116 to detect human joints from the image with a certain confidence score for each of the human joints. The ML model 104 may include electronic data, which may be implemented, for example, as a software component, and may rely on code databases, libraries, external scripts, or other logic or instructions for execution of an ML algorithm by a computing system, such as by the system 102. The ML model 104 may be implemented as code and routines configured to enable a computing system, such as the system 102, to perform human joint detection from an image of the human subject 116. Additionally, or alternatively, the ML model 104 may be implemented using hardware including a processor, a microprocessor (e.g., to perform or control performance of the one or more operations), a field-programmable gate array (FPGA), or an application-specific integrated circuit (ASIC). In some other instances, the ML model 104 may be implemented using a combination of both hardware and software.

In accordance with an embodiment, the ML model 104 may be a neural network model. Examples of the neural network model may include, but are not limited to, a deep neural network (DNN), a convolutional neural network (CNN), a recurrent neural network (RNN), a CNN-recurrent neural network (CNN-RNN), R-CNN, Fast R-CNN, Faster R-CNN, an artificial neural network (ANN), (You Only Look Once) YOLO network, a Long Short Term Memory (LSTM) network based RNN, CNN+ANN, LSTM+ANN, a gated recurrent unit (GRU)-based RNN, a fully connected neural network, a Connectionist Temporal Classification (CTC) based RNN, a deep Bayesian neural network, a Generative Adversarial Network (GAN), and/or a combination of such networks. In certain embodiments, the neural network model may be based on a hybrid architecture of multiple Deep Neural Networks (DNNs).

Each of the set of anchor camera devices 106 may include suitable logic, circuitry, interfaces, and/or code that may be configured to capture an image or a plurality of images that may include the human subject 116. Each anchor camera device may be fixed at a certain position in the 3D space 114. For example, an anchor camera device may be fixed at a pre-determined position on a wall or a roof. Examples of implementation of an anchor camera device may include, but are not limited to, a pre-calibrated fixed camera in the 3D space 114, a pre-calibrated camera mounted on or integrated with a UAV that may be configured to maintain a fixed pose in the 3D space 114, or a pre-calibrated camera that may be moveably coupled to a remotely-controlled camera movement assembly.

Each UAV of the group of UAVs 108 may include a UAV which may be fitted with a camera (initially uncalibrated). Further, each UAV may be either controlled by a remote system or may be capable of autonomous flights based on preprogrammed routes or paths. In at least one embodiment, each UAV may implement a human tracking method to align itself in the 3D space 114 and to follow the human subject 116 such that the human subject 116 is always in a FOV region of the camera fitted on the respective UAV. In at least one embodiment, each UAV may be controlled by a human pilot from a central control station, which may be a part of as the system 102.

In accordance with an embodiment, each of the group of UAVs 108 (for example, the first UAV 108a and the second UAV 108b) may receive control instructions from the system 102, via the communication network 110. The control instructions may include a 3D position (X-axis, Y-axis, or Z-axis) or a 3D path based on which one or more of the group of UAVs 108 may move in the 3D space 114. In some embodiments, such instructions may include tilt or orientation information which may be associated with a 3D pose of each UAV in the 3D space 114. The group of UAVs 108 may control their tilt angle or orientation as well as vertical alignment or horizontal alignment based on the control instructions received from the system 102. Examples of a UAV may include, but are not limited to, a camera drone, a camera-fitted smart plane, or other airborne vehicles which may be controlled based on pre-programmed flight plans and/or automation systems (such as by the system 102). Based on a frame type and number of motors, examples of a UAV may include, but are not limited to, a tri-copter with three arms and one motor, a quad-copter with four arms and one motor, a hexa-copter with six arms and one motor, a Y6-copter with six arms and six motors, an octo-copter with eight arms and one motor, and/or an X8-copter with eight arms and eight motors.

Each of the first camera 112a and the second camera 112b may include suitable logic, circuitry, interfaces, and/or code that may be configured to capture an image or a plurality of images that may include the human subject 116. Each of the first camera 112a and the second camera 112b may be mounted on or integrated with a UAV. Examples of the first camera 112a and the second camera 112b may include, but are not limited to, a single-lens reflex camera, a digital single-lens reflex camera, a studio or broadcast grade camera, a high-speed camera, a wide-angle camera, an action camera, a closed-circuit television (CCTV) camera, a camcorder, a digital camera, camera phones, a time-of-flight camera (ToF camera), a night-vision camera, and/or other image capture devices.

The communication network 110 may include a communication medium through which the system 102, the set of anchor camera devices 106, and the group of UAVs 108 may communicate with each other. Examples of the communication network 110 may include, but are not limited to, internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 110, in accordance with various wired and wireless communication protocols. Examples of such wired and wireless communication protocols may include, but are not limited to, a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In described embodiments, the 3D space 114 may be a built environment (e.g., an indoor, an outdoor, or a studio space) or a natural environment in which images of the human subject 116 may be captured from multiple viewpoints.

In operation, the system 102 may receive a user input from a user (such as the human subject 116 or another human operator) through a user interface of the system 102. The user input may instruct the system 102 to calibrate each camera (such as the first camera 112a and the second camera 112b) mounted on or integrated with the group of UAVs 108.

In order to initialize a calibration process for such cameras on the group of UAVs 108, images may be acquired from the set of anchor camera device 106 and from the cameras (the first camera 112a and the second camera 112b) mounted on or integrated with the group of UAVs 108. Thereafter, the system 102 may receive a set of anchor images of the human subject 116 from the set of anchor camera devices 106. Additionally, the system 102 may receive a group of images of the human subject 116 from the cameras mounted on or integrated with the group of UAVs 108. The received group of images may be acquired from multiple viewpoints in the 3D space 114. For example, a first number of images from the group of images may be captured by the first camera 112a, while remaining number of images may be captured by the second camera 112b.

The system 102 may determine a first set of 2D positions of the human joints for the human subject 116 in each anchor image of the received set of anchor images. The set of anchor images captured by the set of anchor camera devices 106 may include accurate positions of key-points of objects (e.g., 2D positions of the human joints) as each of the anchor camera devices may be pre-calibrated and fixed to a known location in the 3D space 114. For the present disclosure, the positions of the human joints may be treated as rigid and articulate points in the 3D space 114. Also, distance between the human joints may be set based on experimental results.

The system 102 may further determine a second set of 2D positions of the human joints for the human subject 116 in each image of the received group of images. In an embodiment, the system 102 may use the ML model 104 to determine the first set of 2D positions from the set of anchor images and to determine the second set of 2D positions from the group of images. Examples of the implementation of the ML model 104 may include, but are not limited to, Open Pose, Alpha Pose, and Mask Region-Convolution Neural Network (R-CNN).

The system 102 may further compute 3D positions of the human joints in the 3D space 114 as 3D key-points, based on a triangulation (e.g., using a geometric triangulation method) using the determined first set of 2D positions of the human joints. Further, the system 102 may determine a 2D reprojection error between the 3D key-points and the determined second set of 2D positions. The system 102 may calibrate each camera on a respective UAV of the group of UAVs 108 by minimizing the determined 2D reprojection error. For example, for calibration of the first camera 112a, the 3D key-points may be re-projected onto an image plane of the first camera 112a mounted on or integrated with the first UAV 108a. Thereafter, a reprojection error may be determined between each re-projected 3D key-point and a 2D position of a corresponding human joint. An objective function may be formulated and solved to minimize the re-projection error. The aforementioned method may be repeated for the second camera 112b as well. As cameras on each UAV of the group of UAVs 108 may be initially un-calibrated, 3D key-point based camera calibration of the cameras may result in estimation of values of extrinsic calibration parameters (i.e. a 3D pose) for each camera fitted on a respective UAV of the group of UAVs 108.

The detection of the 2D positions of the human joints of the human subject 116 based on the ML model 104 may be less error prone and may not require manual inputs. Further, the system 102 may compute larger number of 3D key-points as compared to a number of key-points that may be computed based on traditional camera calibration techniques which use conventional 2D patterns, such as checker-board patterns. The disclosed camera calibration technique may be less prone to the point-mismatch problem as the point mis-matching errors, if any, may be suppressed by use of one or more statistical techniques on the large number of the 3D key-points. Also, use of human joints for calibration may remove a need for manually placing a calibration pattern, such as checkerboards.

Figure 2:
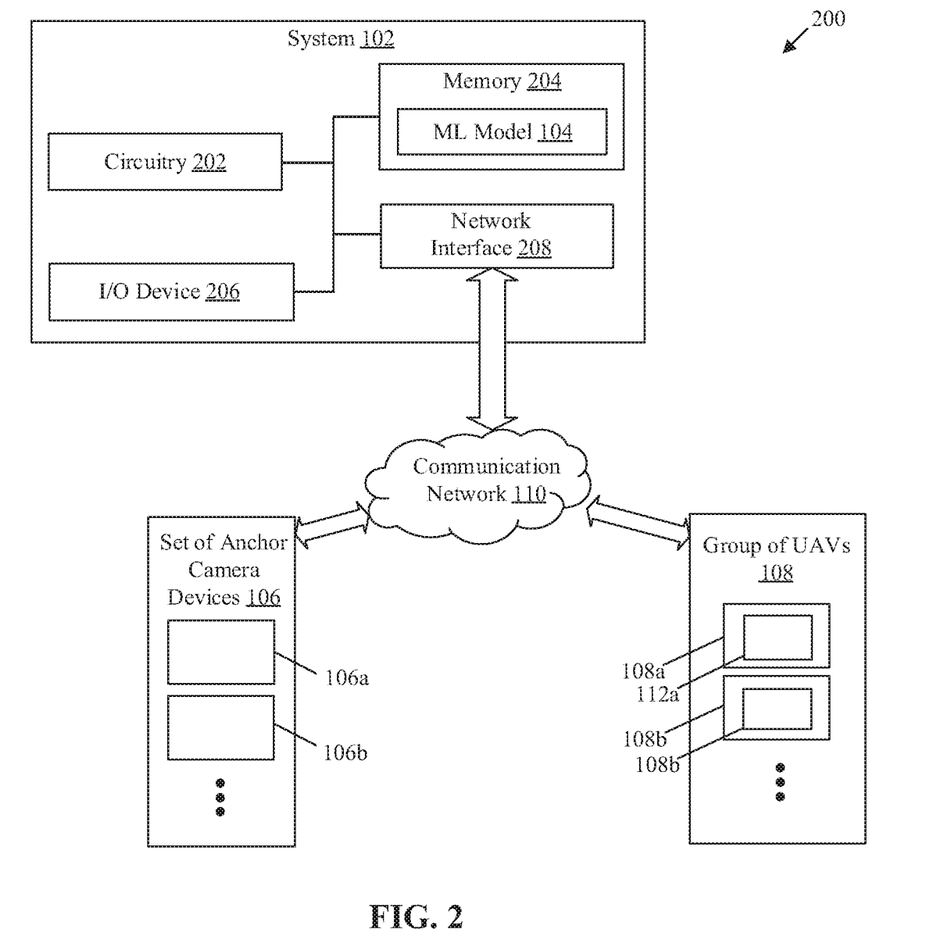
FIG. 2 is a block diagram that illustrates an exemplary system for calibration of a group of cameras mounted on or integrated with a group of UAVs, in accordance with an embodiment of the disclosure.

FIG. 2 is a block diagram that illustrates an exemplary system for calibration of a group of cameras mounted on or integrated with a group of UAVs, in accordance with an embodiment of the disclosure. FIG. 2 is explained in conjunction with elements from FIG. 1. With reference to FIG. 2, there is shown a block diagram 200 of the system 102. The system 102 may include circuitry 202, a memory 204, an input/output (I/O) device 206, and a network interface 208. The circuitry 202 may be communicatively coupled to the memory 204, the I/O device 206, and the network interface 208. Additionally, the circuitry 202 may be communicatively coupled through the communication network 110 to the set of anchor camera devices 106 and the group of cameras 112 mounted on or integrated with the group of UAVs 108. As shown in FIG. 2, the group of UAVs 108 may include the first UAV 108a which may carry the first camera 112a and the second UAV 108b which may carry the second camera 112b. Also, the set of anchor camera devices 106 is shown to include the first anchor camera device 106a and the second anchor camera device 106b.

The circuitry 202 may include suitable logic, circuitry, interfaces, and/or code that may be configured to execute instructions stored in the memory 204. The executed instructions may correspond to a set of control operations for calibration of each camera of the group of cameras 112 (such as the first camera 112a and the second camera 112b) mounted on or integrated with the group of UAVs 108. The circuitry 202 may be implemented based on processor technologies known in the art. Examples of the circuitry 202 may include, but are not limited to, a Graphical Processing Unit (GPU), a co-processor, a Central Processing Unit (CPU), x86-based processor, a Reduced Instruction Set Computing (RISC) processor, an Application-Specific Integrated Circuit (ASIC) processor, a Complex Instruction Set Computing (CISC) processor, and a combination thereof.

The memory 204 may include suitable logic, circuitry, interfaces, and/or code that may be configured to store the instructions executable by the circuitry 202. Also, the memory 204 may be configured to store the set of anchor images and the group of images of the human subject 116. The memory 204 may be further configured to store the ML model 104 that may be used for determination of the first set of 2D positions of the human joints from the set of anchor images and the second set of 2D positions of the human joints from the group of images. Also, the memory 204 may store the X, Y, and Z co-ordinates of the computed 3D key-points. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input from a user and provide an output to the user based on the received input. The I/O device 206 may include various input and output devices, which may be configured to communicate with the circuitry 202. Examples of the input devices may include, but are not limited to, a touch screen, a keyboard, and/or a mouse. Examples of the output devices may include, but are not limited to, a display, and an audio device.

The network interface 208 may include suitable logic, circuitry, interfaces, and/or code that may be configured to establish a communication between the system 102, the set of anchor camera devices 106, the group of cameras 112, and the group of UAVs 108, via the communication network 110. The network interface 208 may be implemented by use of various known technologies to support wired or wireless communication by the system 102 via the communication network 110. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 208 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), Wi-MAX, a protocol for email, instant messaging, and/or Short Message Service (SMS).

The functions or operations executed by the system 102, as described in FIG. 1, may be performed by the circuitry 202. Operations executed by the circuitry 202 are described in detail, for example, in the FIGS. 4, 5, and 6.

Figure 3:
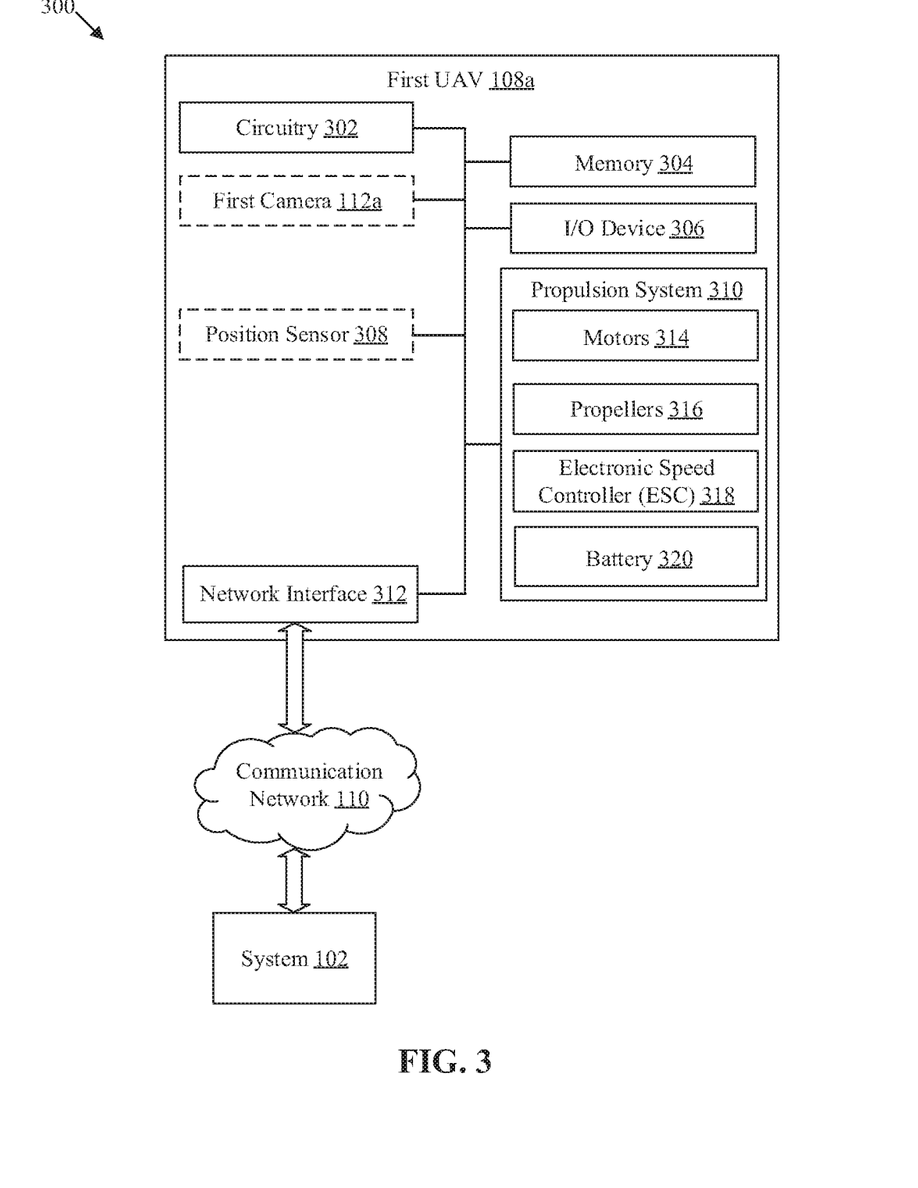
FIG. 3 is a block diagram that illustrates an exemplary UAV, in accordance with an embodiment of the disclosure.

FIG. 3 is a block diagram of an exemplary UAV, in accordance with an embodiment of the disclosure. FIG. 3 is explained in conjunction with elements from FIG. 1 and FIG. 2. With reference to FIG. 3, there is shown a block diagram 300 of the first UAV 108a, which may be one of the group of UAVs 108. The first UAV 108a may include circuitry 302, a memory 304, a I/O device 306, a position sensor 308, a propulsion system 310, and a network interface 312. The propulsion system 310 may include motors 314, propellers 316, an electronic speed controller (ESC) 318, and a battery 320. A person of ordinary skill in the art will understand that the first UAV 108a may also include other suitable components or systems, in addition to the components or systems which are illustrated herein to describe and explain the function and operation of the present disclosure. A detailed description for other components or systems of the first UAV 108a is omitted from the disclosure for the sake of brevity.

The first UAV 108a and the system 102 may be communicatively coupled to each other, via the communication network 110. The first camera 112a may be configured to be mounted on or integrated with the first UAV 308a so that the first camera 112a can have various degrees of freedom (DOF), such as 6 DOF in the 3D space 114. The functions of the circuitry 302, the memory 304, the I/O device 306, and the network interface 312, as shown in the block diagram 300 of the first UAV 108a, may be same as the functions of the circuitry 202, the memory 204, the I/O device 206, and the network interface 208, as described, for example, in FIG. 2. Therefore, the description of the circuitry 302, the memory 304, the I/O device 306, and the network interface 312 is omitted from the disclosure for the sake of brevity.

The position sensor 308 may include suitable logic, circuitry, interfaces, and/or code that may be configured to determine a current position of the first UAV 108a in the 3D space 114. In at least one embodiment, the position sensor 308 may also determine an orientation (along a pitch axis, a roll axis, or yaw axis) in the 3D space 114. The position sensor 308 may communicate the current position and/or the orientation of the first UAV 108a to the circuitry 302 and/or the system 102. The circuitry 302 and/or the system 102 may control a position and/or an orientation of the first UAV 108a based on the communicated current position and/or the orientation of the first UAV 108a. Examples of the position sensor 308 may include, but are not limited to, a Global Navigation Satellite System (GNSS) receiver, a motion sensor, a tilt sensor, an accelerometer, a gyro sensor, an Inertial Measurement Unit (IMU), or a sensing camera.

In an embodiment, the position sensor 308 may be implemented as an infra-red (IR) marker sensor or a pattern code scanner. In case of the IR marker sensor, a source of IR light may be affixed at a pre-determined position in the 3D space 114. The source may emit IR light in periodic flashes or in a continuous manner and the first camera 112a mounted on or integrated with the first UAV 108a may track and capture the emitted IR light as one or more IR-images. Thereafter, the circuitry 302 may apply a 3D pose estimation technique (such as, Pose from Orthography and Scaling with Iteration (POSIT) method) on the one or more IR-images to determine a position and/or an orientation of the first UAV 108a with respect to the source of the IR light. In certain scenarios, the pre-determined position of the source of IR light may be known and stored in the memory 304 of the first UAV 108a. In such a scenario, the circuitry 302 may determine an absolute position and/or orientation of the first UAV 108a based on the pre-determined position of the source of the IR light and the determined position and/or orientation of the first UAV 108a.

In case of the pattern code scanner, a pattern code marker, for example, a QR code marker or a bar code marker, may be placed at a pre-determined position in the 3D space 114. The first camera 112a may track the pattern code marker and capture an image of the pattern code marker. The memory 304 may store a reference image of the pattern code marker and the pre-determined position of the pattern code marker. The circuitry 302 may compare the captured image with the reference image to determine a position and/or an orientation of the first UAV 108a with respect to the pattern code marker. Also, the circuitry 302 may determine an absolute position and/or orientation of the first UAV 108a based on the pre-determined position of the pattern code marker and the determined position and/or orientation of the first UAV 108a.

The propulsion system 310 may include a set of mechanical, electrical, or fuel-based components which may generate a lifting force and a thrust to move the first UAV 108a between two positions in the 3D space 114. The propulsion system 310 may control the movement of the first UAV 108a based on one or more control instructions received from the circuitry 302 or the system 102. The propulsion system 310 may further include the motors 314, the propellers 316, the ESC 318, and the battery 320.

Circuitry (such as the circuitry 302), a memory (such as the memory 304), a I/O device (such as the I/O device 306), a position sensor (such as the position sensor 308), a propulsion system (such as the propulsion system 310), and a network interface (such as the network interface 312) may also be included in other UAVs of the group of UAVs 108. In an embodiment, the first UAV 108a may act as a master UAV and other UAVs may act as slave UAVs which may receive one or more control instructions from the master UAV.

Figure 4:
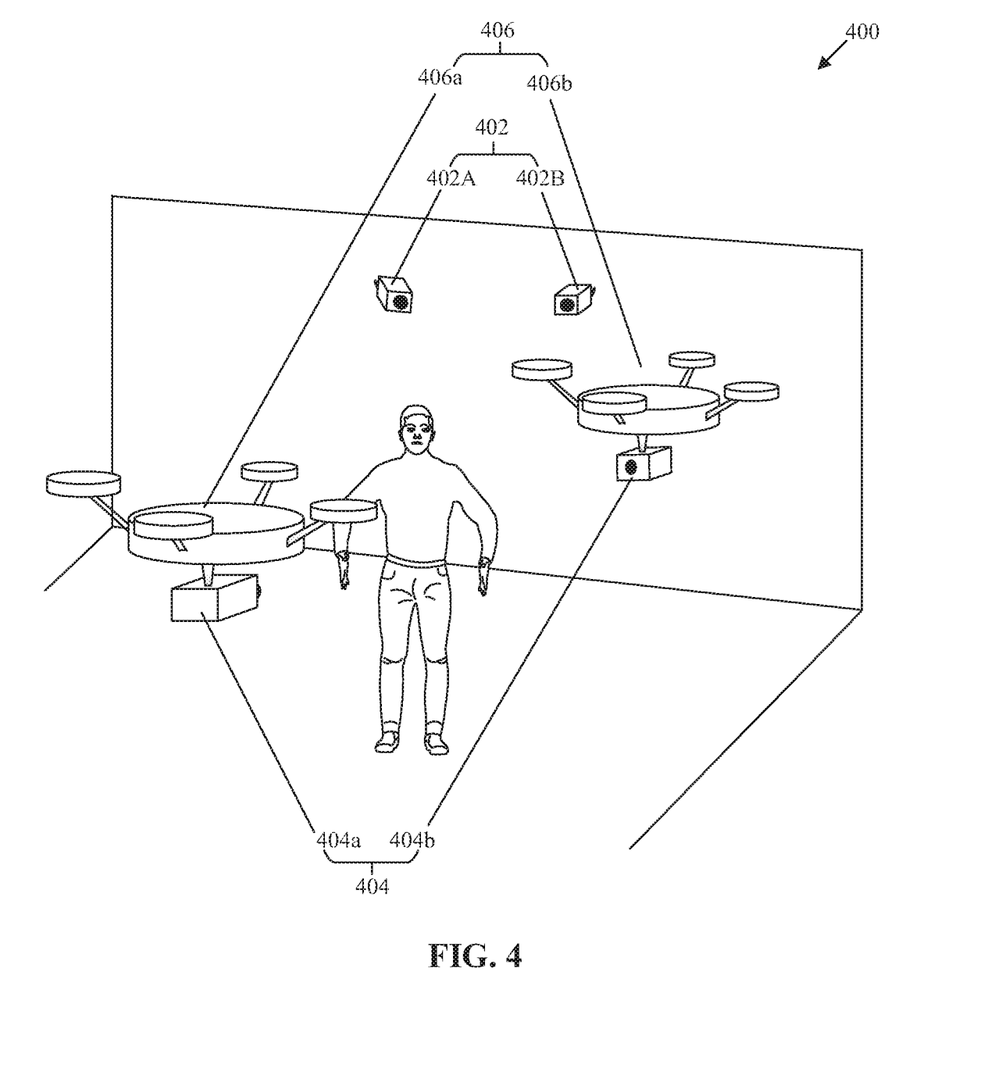
FIG. 4 is a diagram that illustrates an exemplary implementation of cameras mounted on or integrated with UAVs and anchor cameras devices for acquisition of images of a human subject, in accordance with an embodiment of the disclosure.

FIG. 4 is a diagram that illustrates an exemplary implementation of cameras mounted on or integrated with UAVs and anchor cameras devices for acquisition of images of a human subject, in accordance with an embodiment of the disclosure. FIG. 4 is explained in conjunction with elements from FIG. 1, 2, or 3. With reference to FIG. 4, there is shown a diagram 400 that depicts an arrangement of a first anchor camera 402a and a second anchor camera 402b (collectively referred as a set of anchor cameras 402) that may face a posterior side of the human subject 116. The diagram 400 also depicts an arrangement of a first camera 404a and a second camera 404b (collectively referred to as a group of cameras 404) mounted on or integrated with a first UAV 406a and a second UAV 406b, respectively. The first UAV 406a and the second UAV 406b may be collectively referred as a group of UAVs 406 and that may face an anterior side of the human subject 116.

Each of the set of anchor cameras 402 may correspond to a pre-calibrated camera that may be fixed to a position (e.g., a certain surface, such as, a ceiling, floor, or a wall or a stationary structure). The first anchor camera 402a and the second anchor camera 402b may be configured to capture a first anchor image and a second anchor image, respectively (collectively referred as a set of anchor images) of the human subject 116. For acquisition of the set of anchor images, the set of anchor cameras 402 may be controlled by the system 102 based on control instructions shared via the communication network 110.

Additionally, the system 102 may control the group of UAVs 406 to move at the multiple viewpoints in the 3D space 114 and may control the group of cameras 404 mounted on or integrated with the group of UAVs 406 to acquire the group of images of the human subject 116 from such viewpoints. In at least one embodiment, such viewpoints may be selected by the system 102 to ensure that the FOV region of each of the group of cameras 404 captures a portion of the body of the human subject 116, from which a minimum required number of the human joints can be later detected. Once captured, the set of anchor cameras 402 and the group of cameras 404 mounted on or integrated with the group of UAVs 406 may transmit the set of anchor images and the group of images of the human subject 116, respectively, to the system 102. Calibration of the first camera 404a and the second camera 404b based on the set of anchor images and the group of images is explained in detail, for example, in FIG. 6.

Figure 5:
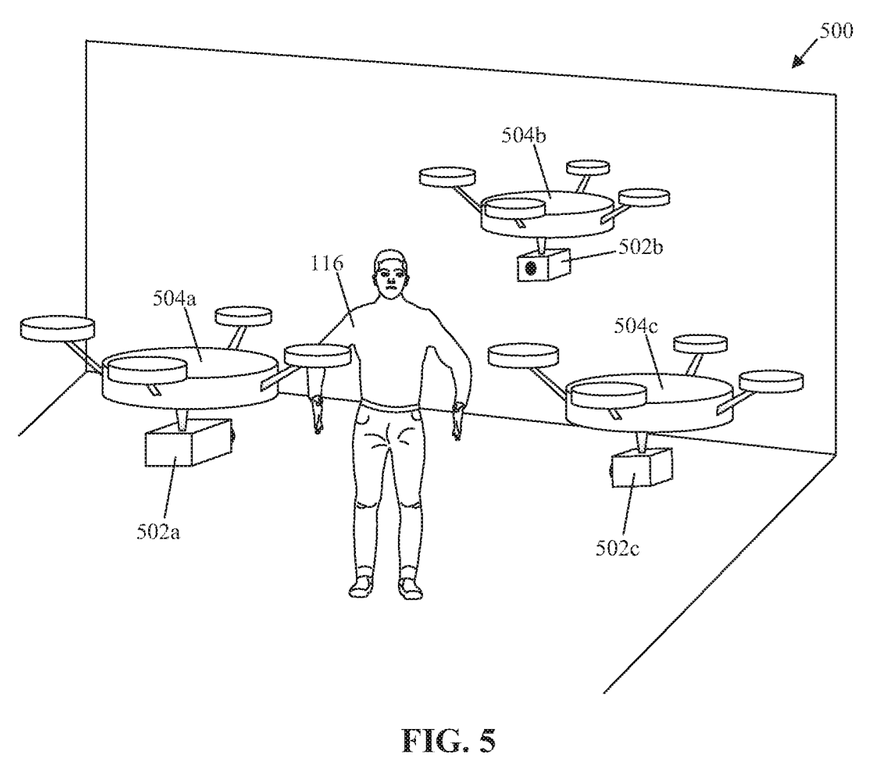
FIG. 5 is a diagram that illustrates an exemplary implementation of cameras mounted on or integrated with UAVs and anchor cameras devices for acquisition of images of a human subject, in accordance with an embodiment of the disclosure.

FIG. 5 is a diagram that illustrates an exemplary implementation of cameras mounted on or integrated with UAVs and anchor cameras devices for acquisition of images of a human subject, in accordance with an embodiment of the disclosure. FIG. 5 is explained in conjunction with elements from FIGS. 1, 2, and 3. With reference to FIG. 5, there is shown a diagram 500 that depicts a first camera 502a, a second camera 502b, and a third camera 502c in the 3D space 114. The first camera 502a, the second camera 502b, and the third camera 502c may be mounted on or integrated with a first UAV 504a, a second UAV 504b and a third UAV 504c, respectively.

The first UAV 504a may maintain a fixed pose in the 3D space 114. Herein, the fixed pose may correspond to a static position and static orientation (roll, yaw, pitch) of the first UAV 504a in the 3D space 114. In such a case, the assembly of the first camera 502a and the first UAV 504a may be designated as an anchor camera device that may use the first camera 502a to capture a set of anchor images of the human subject 116 while remaining in the fixed pose. Also, the first camera 502a may be pre-calibrated with respect to the fixed pose of the first UAV 504a. The remaining UAVs (i.e., the second UAV 504b and the third UAV 504c, collectively referred to as a group of UAVs) may be controlled to move relatively to the fixed pose to acquire a group of images of the human subject 116 from multiple viewpoints.

The system 102 may control each of the second UAV 504b and the third UAV 504c to move to such viewpoints and capture the group of images from such viewpoints in the 3D space 114. Once captured, the first UAV 504a or the first camera 502a on the first UAV 504a may transmit the set of anchor images of the human subject 116 to the system 102. Also, the group of cameras (i.e., the second camera 502b and the third camera 502c) may transmit the group of images of the human subject 116 to the system 102. Calibration of the second camera 502b and the third camera 502c (collectively referred as the group of cameras) may be based on the set of anchor images and the group of images, as is explained in detail, for example, in FIG. 6.

Figure 6:
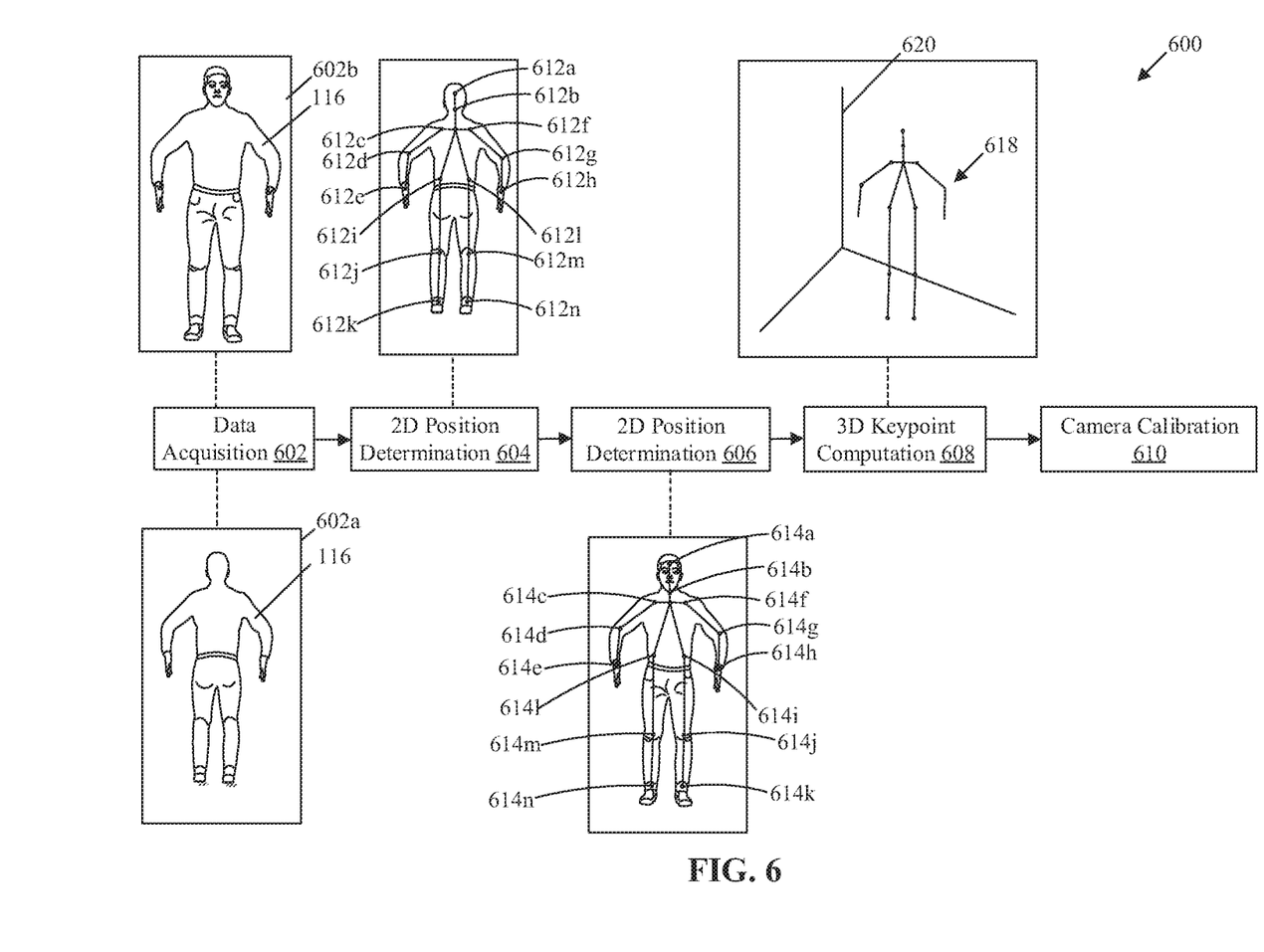
FIG. 6 is a diagram that illustrates exemplary operations for calibration of cameras on UAVs based on human joints, in accordance with an embodiment of the disclosure.

FIG. 6 is a diagram that illustrates exemplary operations for calibration of cameras on UAVs based on human joints, in accordance with an embodiment of the disclosure. FIG. 6 is explained in conjunction with elements from FIG. 1, 2, 3, 4, or 5. With reference to FIG. 6, there is shown a diagram 600 to depict exemplary operations from 602 to 610 for the calibration of the first camera 404a mounted on or integrated with the first UAV 406a and the second camera 404b mounted on or integrated with the second UAV 406b. The exemplary operations illustrated in the diagram 600 may start at 602 and may be performed by any computing system, apparatus, or device, such as by the system 102 of FIG. 1 or the circuitry 302 of FIG. 3. Although illustrated with discrete blocks, the operations associated with one or more of the blocks of the diagram 600 may be divided into additional blocks, combined into fewer blocks, or eliminated, depending on the particular implementation.

At 602, data acquisition may be performed. For data acquisition, the circuitry 202 may control the set of anchor cameras 402 (which includes the first anchor camera 402a and the second anchor camera 402b) to capture a set of anchor images of the human subject 116. The set of anchor cameras 402 may be fixed at certain positions in the 3D space 114 from where the set of anchor cameras 402 may capture the set of anchor images. Additionally, the circuitry 202 may control the group of UAVs 406 to move the group of UAVs 406 at multiple viewpoints in the 3D space 114. Thereafter, the group of cameras 404 mounted on or integrated with the group of UAVs 406 may be controlled to acquire the group of images of the human subject 116 from the multiple viewpoints. In FIG. 6, there is shown an example of an anchor image 602a and an image 602b acquired from one of the group of cameras 404. Both the anchor image 602a and the image 602b include the human subject 116. The circuitry 202 may receive the set of anchor images from the set of anchor cameras 402 and receive the group of images from the group of cameras 404 mounted on or integrated with the group of UAVs 406, via the communication network 110.

At 604, a first set of 2D positions of human joints may be determined from the set of anchor images. The circuitry 202 may be configured to determine the first set of 2D positions of the human joints of the human subject 116 from the set of anchor images (for example, the anchor image 602a). For such determination, the circuitry 202 may apply the ML model 104 on each anchor image (such as the anchor image 602a) of the set of anchor images. The ML model 104 may correspond to a human-joint detection framework that may include a neural network trained on a human joint detection task. 2D positions (i.e., the first set of 2D positions) of the human joints may be represented by equation (1), given as follows:

$$\{(u_i^n, v_i^n, w_i^n, t_i^n) | i \in [0:M]; n \in [0:N]\} \quad (1)$$

where, $(u_i^n, v_i^n)$: 2D position of $i^{th}$ detected human joint;
$w_i^n \in [0:1]$: confidence value of the $i^{th}$ detected human joint;
$t_i^n$: type (e.g., left wrist or right elbow) of the $i^{th}$ detected human joint; and
M: total number of detected human joints.

As shown, the anchor image 602a may be captured from a posterior view of the human subject 116. The human joint positions 612a and 612b may correspond to a head and a neck, respectively, of the human subject 116 in the anchor image 602a. Further, the human joint positions 612c, 612d, and 612e may correspond to a left shoulder joint, a left elbow joint, and a left wrist joint of the human subject 116 in the anchor image 602a. The human joint positions 612f, 612g, and 612h may correspond to a right shoulder joint, a right elbow joint, and a right wrist joint of the human subject 116 in the anchor image 602a. Further, the human joint positions 612i, 612j, and 612k may correspond to a left waist joint, a left knee joint, and a left ankle joint of the human subject 116 in the anchor image 602a, while the human joint positions 612l, 612m, and 612n may correspond to a right waist joint, a right knee joint, and a right ankle joint of the human subject 116 in the anchor image 602a.

At 606, a second set of 2D positions of the human joints may be detected from the group of images. The circuitry 202 may be configured to detect the second set of 2D positions of the human joints of the human subject 116 from the group of images (for example, the image 602b). To detect the second set of 2D positions, the circuitry 202 may apply the ML model 104 on each image (e.g., the image 602b) from the group of images. The second set of 2D positions may be also be given by equation (1).

As shown, the circuitry 202 may determine the second set of 2D positions of the human joints of the human subject 116 from the image 602b as human joint positions 614a to 614n. The image 602b may be captured from an anterior portion of the human subject 116. The human joint positions 614a and 614b may correspond to a head and a neck of the human subject 116 in the image 602b. Further, the human joint positions 614c, 614d, and 614e may correspond to a right shoulder joint, a right elbow joint, and a right wrist joint of the human subject 116 in the image 602b. The human joint positions 614f, 614g, and 614h may correspond to a left shoulder joint, a left elbow joint, and a left wrist joint of the human subject 116 in the image 602b. Further, the human joint positions 614i, 616j, and 614k may correspond to a right waist joint, a right knee joint, and a right ankle joint of the human subject 116 in the image 602b, while the human joint positions 614l, 614m, and 614n may correspond to a left waist joint, a left knee joint, and a left ankle joint of the human subject 116 in the image 602b.

At 608, 3D key-points 618 may be computed. The circuitry 202 may compute 3D positions of the human joints of the human subject 116 based on a triangulation using the determined first set of 2D positions of the human joints. The circuitry 202 may designate the 3D key-points 618 as the computed 3D positions of the human joints of the human subject 116 with respect to a 3D co-ordinate system 620. The computation of the 3D key-points 618 is explained herein. A simple perspective camera model may be adopted to convert human joint position values from the 2D image-plane to the 3D real-space. In such a scenario, perspective projection-rays (with weight and label) for each detected human joint point may be obtained by use of the pre-determined intrinsic camera parameters and Special Euclidian Group in 3 dimensions (i.e., se(3) parameters). The perspective camera model as per the above scenario may be represented as follows:

$$\{(u_i^n, v_i^n, w_i^n, t_i^n) | i \in [0:M]; n \in [0:N]\} \quad (2)$$

Where, $e_{\{i\}}^n = (e_{\{i,x\}}^n, e_{\{i,y\}}^n, e_{\{i,z\}}^n)$: normalized directional vector of $i^{th}$ human joint from $n^{th}$ camera in 3D; and
$a_{\{i\}}^{\{n\}} = (a_{\{x\}}^n, a_{\{y\}}^n, a_{\{z\}}^n)$: $n^{th}$ camera position in 3D.

The circuitry 202 may perform the triangulation using the first set of 2D positions of the human joints along a 3D line (i.e., a ray) by using a known or calibrated optical center of a calibrated camera (e.g., the first anchor camera 402a). Consider "e" as a normalized directional 3D vector associated with a 2D position (from the first set of 2D positions) of a certain human joint along a 3D line through the calibrated optical center. "e" may represent the normalized directional 3D vector of the particular human joint from the calibrated camera along the 3D line. Further, consider "a" as a 3D point on that 3D line through the calibrated optical center. Herein, the 3D point "a" on the 3D line may represent a camera position of an intrinsically calibrated camera (e.g., the first anchor camera 402a) of a known pose. The distance between the 3D line and the 3D point may be given by equations (3.1) and (3.2) as follows:

$$d^2 = l^2 \sin^2\theta = |e \times (x-a)|^2 \qquad (3.1)$$

$$d^2 = l^2(1-\cos^2\theta) = |x-a|^2 - \{e \cdot (x-a)\}^2 \qquad (3.2)$$

where,

θ may represent an angle between the normalized 3D vector "e" and the 3D line, x may represent a point on the 3D line from which a perpendicular can be dropped on the 3D vector "e", and l may represent the distance between the 3D point "a" and point "x".

In one embodiment, the circuitry 202 may determine a weighted least square of multiple 3D lines and the respective multiple normalized 3D vectors "e'''" for a human joint for different positions of the anchor camera (such as the first anchor camera 402a). Herein, each of these multiple 3D lines passes through a respective 3D point of multiple 3D points "a'''" which represent different positions of the anchor camera. The weighted least square is represented in equations (4.1) and (4.2), as follows:

$$D^2 = \sum_n w_n d_n^2 \qquad (4.1)$$

$$D^2 = \sum_n w_n [|x-a^n|^2 - \{e^n \cdot (x-a^n)\}^2] \qquad (4.2)$$

where, $w_n$ may represent a weight of $n^{th}$ 3D line, and $d_n$ may represent the distance between the 3D point "an" and the $n^{th}$ 3D line.

Equation (4.2) may be expanded for x-axis co-ordinates of a 3D point along a 3D line. The expansion of equation (4.2) is given by equation (5), as follows:

$$D^2 = \sum_n w_n \left[ \sum_i |x-a_i^n|^2 - \left\{ \sum_i e^n \cdot (x-a_i^n) \right\}^2 \right] \qquad (5)$$

where i may represent an index of the x-axis co-ordinate of a 3D point along a 3D line.

The circuitry 202 may apply a partial derivative operation on the equation (5) to obtain equation (6), as follows:

$$\frac{\partial D^2}{\partial x_i} = \sum_n w_n \left[ \sum_i 2 \cdot |x-a_i^n| - 2 \cdot \left\{ \sum_j e_j^n \cdot (x-a_j^n) \cdot e_i^n \right\} \right] \qquad (6)$$

Where j may represent an index of y-axis co-ordinate of a 3D point along a 3D line. Assuming stationary condition $$-\frac{\partial D^2}{\partial x_i} = 0,$$

may obtain equations (7.1) and (7.2), as follows:

$$\sum_n w_n x_i - \sum_n w_n x_i - \sum_n \sum_j w_n e_j^n x_j e_i^n + \sum_n \sum_j w_n e_j^n a_i^n e_i^n = 0 \qquad (7.1)$$

$$\sum_j \left[ \sum_n w_n (e_i^n e_j^n - \delta_{ij}) \right] \cdot x_j = \sum_n w_n \left( \sum_j a_j^n e_j^n e_i^n - a_i^n \right) \qquad (7.2)$$

Based on equation (7.2), a linear system Ax=B may be obtained. A linear system of equations (8.1) and (8.2) for the linear system Ax=B are provided, as follows:

$$A_{ij} = \sum_n w_n (e_i^n e_j^n - \delta_{ij}) \qquad (8.1)$$

$$B_i = \sum_n w_n \left( \sum_j a_j^n e_j^n e_i^n - a_i^n \right) \qquad (8.2)$$

The circuitry 202 may compute a first 3D key-point of the 3D key-points 618 based on the solution $\{x_i\}$ of the linear system of equations (8.1) and (8.2). The first 3D key-point may be associated with one of the human joints. Similarly. the circuitry 202 may compute remaining 3D key-points associated with remaining human joints using the respective 2D position from determined first set of 2D positions by following the abovementioned method.

At 610, the group of cameras 404 mounted on or integrated with the group of UAVs 406 may be calibrated. The circuitry 202 may calibrate the first camera 404a and the second camera 404b by estimation of a 3D pose (position and orientation) of each of the first camera 404a and the second camera 404b. To estimate target parameters for camera calibration, including camera position and orientation, 6 degrees of freedom (DoF), for multiple cameras (e.g., the first camera 404a, and the second camera 404b), Special Euclidean se(3) Lie algebraic parameterization may be used, as per equation 9:

$$\{(x_0^n, x_1^n, x_2^n, x_3^n, x_4^n, x_5^n) \in se(3) | n \in [0:N]\} \qquad (9)$$

Where,

N: total number of cameras.

The Special Euclidean Lie algebra se(3) may have 6 elements. The first 3 elements ($x_0^n$, $x_1^n$, $x_2^n$) may denote Special Orthogonal Lie algebra (i.e., so(3)), and the later 3 rotation elements ($x_3^n$, $x_4^n$, $x_5^n$) may denote translation elements T(3)∈$R^3$ in 3D space, respectively. For practical operation, exponential mapping se(3)→SE(3) may be adopted for getting matrix representation.

In an embodiment, values of intrinsic calibration parameters of each of the multiple cameras (including the first anchor camera 402a, the second anchor camera 402b, the first camera 404a, and the second camera 404b) may be pre-determined or given.

In an embodiment, the circuitry 202 may be configured to set a global gauge for the estimation of the 3D pose for each camera (e.g., the first camera 404a and the second camera 404b). To set the global gauge, the circuitry 202 may set the position and the orientation of the 0-th camera (e.g., the first anchor camera 402a) as a pre-determined 3D point and direction and denoted as:

$$(x_0^0, x_1^0, x_2^0, x_3^0, x_4^0, x_5^0) = (0,0,0,0,0,0) \qquad (10)$$

The circuitry 202 may set a relative x-distance between the $0^{th}$ camera (e.g., the first anchor camera 402a) and the $1^{st}$ camera (e.g., the second anchor camera 402b) as:

$$x_3^1 = 1 \quad (11)$$

The circuitry 202 may use a "trivial gauge fixing" in bundle adjustment based technique to set the global gauge for the calibration of the group of cameras 404 (e.g., the first camera 404a and the second camera 404b), by use of equations (10) and (11).

The circuitry 202 may be configured to calibrate the group of cameras 404 (e.g., the first camera 404a and the second camera 404b) by estimation of the 3D pose (i.e. extrinsic camera parameters, such as position (i.e., translation parameters) and orientation (i.e., rotation parameters)) for each camera of the group of cameras 404. For such camera calibration, an optimization problem in terms of a 2D reprojection error may be formulated. The circuitry 202 may determine a 2D reprojection error between the 3D key-points 618 and the determined second set of 2D positions of the human joints. Thereafter, the calibration may be performed by minimizing the determined 2D reprojection error using the formulated optimization problem.

For example, for calibration of the first camera 404a, the 3D key-points 618 may be re-projected onto an image plane of the first camera 404a. Thereafter, a reprojection error may be determined between each re-projected 3D key-point and a 2D position of a corresponding human joint. An objective function for an optimization problem may be formulated and solved to minimize the re-projection error. The aforementioned method may be repeated for the second camera 404b as well. As cameras on each UAV of the group of UAVs 406 may be initially un-calibrated, 3D key-point based camera calibration of the cameras may result in estimation of values of extrinsic calibration parameters (i.e. a 3D pose) for each camera fitted on a respective UAV of the group of UAVs 108. The 2D reprojection error may correspond to a geometric error between a point projected based on a perspective camera model view and a measured position of the point in the 3D co-ordinate system 620. The 2D reprojection error may quantify a closeness of an estimate of a 3D key-point with respect to the point's action projection (e.g., the determined second set of 2D positions of the human joints).

For example, consider that a 3D key-point (a target point) of a human joint is represented by co-ordinates (X, Y, Z) in the 3D co-ordinate system 620. The 3D key-point may be re-projected as a 2D point on an image plane associated with an optical center of a camera (such as one of the group of cameras 404). The 2D point may be represented by $(x_p/z_p, y_p/z_p)$. Here, $x_p$, $y_p$, $z_p$ may respectively be x-axis, y-axis, and z-axis co-ordinates of a perspective projection of the re-projected 3D point on the image plane. From the second set of 2D positions of the human joints in the group of images acquired by the group of cameras 404, a 2D position of the human joint on the image plane of the camera may be represented by a 2D point $(x_d, y_d)$. The 2D re-projection error $\delta$ between the 2D point $(x_p/z_p, y_p/z_p)$ and the 2D point $(x_d, y_d)$ may be represented by equation (12), as follows:

$$\delta^2 = (x_p/z_p - x_d)^2 + (y_p/z_p - y_d)^2 \quad (12)$$

Here, xp, yp, and zp are given by equation (13), as follows:

$$\begin{bmatrix} x_p \\ y_p \\ z_p \\ 1 \end{bmatrix} = M \begin{bmatrix} X \\ Y \\ Z \\ 1 \end{bmatrix} \quad (13)$$

where, M is a 4×4 camera projection matrix including the intrinsic parameters of the camera.

The foregoing technique for the calibration of the group of cameras 404 may be referred to as a frame-by-frame calibration technique. Such process may be parallelized for processing on several electronic devices or several processors of a computing device. The present disclosure may also be applicable to other techniques for the calibration of the group of cameras 404, such as a temporal accumulation-based camera calibration technique.

In an embodiment, at least one UAV (e.g., the first UAV 406a) of the group of UAVs 406 may include a position sensor. The position sensor may be one of a Global Navigation Satellite System (GNSS) receiver, an Inertial Measurement Unit (IMU), a sensing camera, an Infra-red marker sensor, or a pattern code scanner. In an embodiment, the circuitry 202 of the system 102 or the circuitry 302 (of the first UAV 406a) may be configured to calibrate each camera mounted on or integrated with the remaining UAVs (e.g., the second UAV 406b) from the group of UAVs 406 further based on absolute position information acquired from the position sensor of the corresponding UAV (e.g., the first UAV 406a).

In another embodiment, each camera (e.g., the first camera 404a and the second camera 404b) of the group of cameras 404 may be calibrated further based on values of the intrinsic calibration parameters for the group of cameras 404 mounted on or integrated with the group of UAVs 406. Examples of such intrinsic calibration parameters may include, but are not limited to, a field of view angle (i.e., focal length and screen size associated with the camera), aspect ratio, and distortion parameters.

Figure 7:
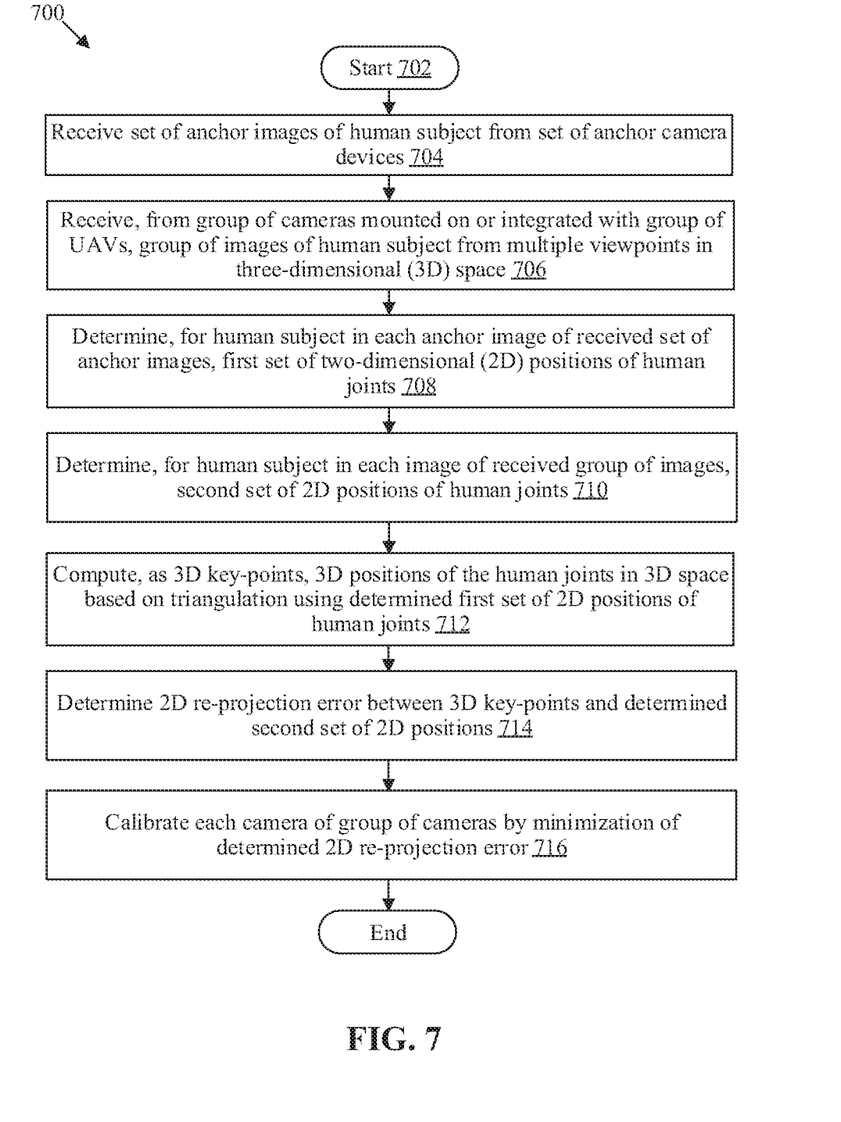
FIG. 7 is a flowchart that illustrates exemplary operations for calibration of a group of cameras mounted on or integrated with a group of UAVs, in accordance with an embodiment of the disclosure.

FIG. 7 is a flowchart that illustrates exemplary operations for calibration of a group of cameras mounted on or integrated with a group of UAVs, in accordance with an embodiment of the disclosure. With reference to FIG. 7, there is shown a flowchart 700. The flowchart 700 is described in conjunction with FIGS. 1, 2, 3, 4, 5, and 6. The method from 702 to 716 may be implemented by any computing system, such as by the system 102 of FIG. 1 or the circuitry 302 of FIG. 3. The operations in the flowchart 700 may start at 702 and proceed to 704.

At 704, a set of anchor images of the human subject 116 may be received from the set of anchor camera devices 106. In at least one embodiment, the circuitry 202 may be configured to receive the set of anchor images from the set of anchor camera devices 106.

At 706, a group of images of the human subject 116 from multiple viewpoints in the 3D space 114 may be received from the group of cameras 112 mounted on or integrated with the group of UAVs 108. In at least one embodiment, the circuitry 202 may be configured to receive the group of images from the group of cameras.

At 708, for the human subject 116 in each anchor image of the received set of anchor images, a first set of 2D positions of human joints may be determined. In at least one embodiment, the circuitry 202 may determine the first set of 2D positions of the human joints of the human subject 116 in each anchor image of the set of anchor images.

At 710, for the human subject 116 in each image of the received group of images, a second set of 2D positions of the human joints may be determined. In at least one embodiment, the circuitry 202 may determine the second set of 2D positions of the human joints of the human subject 116 in each image of the group of images.

At 712, 3D positions of the human joints in the 3D space (e.g., the 3D space 114) may be computed as 3D key-points, based on a triangulation using the determined first set of 2D positions of the human joints. In at least one embodiment, the circuitry 202 may compute, as the 3D key-points, the 3D positions of the human joints in the 3D space 114 based on a triangulation by use of the determined first set of 2D positions of the human joints.

At 714, a 2D re-projection error between the 3D key-points and the determined second set of 2D positions may be determined. In at least one embodiment, the circuitry 202 may determine the 2D re-projection error between the 3D key-points and the determined second set of 2D positions.

At 716, each camera of the group of cameras 112 may be calibrated by minimizing the determined 2D reprojection error. In at least one embodiment, the circuitry 202 may calibrate each camera of the group of cameras 112 by minimizing the determined 2D re-projection error. Control may pass to end.

Although the flowchart 700 is illustrated as discrete operations, such as 704, 706, 708, 710, 712, 714, and 716, however, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory, computer-readable medium and/or storage medium, and/or a non-transitory machine readable medium and/or storage medium stored thereon, a set of instructions executable by a machine and/or a computer that comprises one or more circuits. The set of instructions may be executable by the machine and/or the computer to perform operations that include reception of a set of anchor images of a human subject from a set of anchor camera devices. The operations further include reception of a group of images of the human subject from multiple viewpoints in three-dimensional (3D) space, from a group of cameras mounted on or integrated with a group of UAVs. Further, the operations include determination, for the human subject in each anchor image of the received set of anchor images, a first set of two-dimensional (2D) positions of human joints. The operations further include determination, for the human subject in each image of the received group of images, a second set of 2D positions of the human joints. The operations further include computation of 3D positions of the human joints as 3D key-points in the 3D space based on a triangulation using the determined first set of 2D positions of the human joints. The operations further include determination of a 2D re-projection error between the 3D key-points and the determined second set of 2D positions and calibration of each camera of the group of cameras by minimizing the determined 2D re-projection error.

Certain embodiments of the disclosure may be found in a system and method for calibration of cameras mounted on or integrated with UAVs. Various embodiments of the disclosure may provide a system (such as the system 102 (FIG. 1)), which may include circuitry (such as the circuitry 202 (FIG. 2)). The circuitry 202 may be configured to receive a set of anchor images of a human subject (e.g., the human subject 116 (FIG. 1)) from a set of anchor camera devices (such as, the set of anchor camera devices 106 (FIG. 1)). Further, the circuitry 202 may be configured to receive a group of images of the human subject 116 from multiple viewpoints in 3D space (e.g., the 3D space 114 (FIG. 1)), from a group of cameras (e.g., the first camera 112a and the second camera 112b (FIG. 1)) on a group of UAVs (such as, the group of UAVs 108 (FIG. 1)). For the human subject 116 in each anchor image of the received set of anchor images, the circuitry 202 may determine a first set of 2D positions of human joints. Further, for the human subject 116 in each image of the received group of images, the circuitry 202 may determine a second set of 2D positions of the human joints. In addition, the circuitry 202 may compute, as 3D key-points, 3D positions of the human joints in the 3D space based on a triangulation using the determined first set of 2D positions of the human joints. The circuitry 202 may determine a 2D re-projection error between the 3D key-points and the determined second set of 2D positions. Further, the circuitry 202 may calibrate each camera (e.g., the first camera 112a and the second camera 112b) of the group of cameras by minimizing the determined 2D re-projection error.

In an embodiment, the 3D space 114 may be associated with one of an outdoor space, an indoor space, or a studio-setup for volumetric capture. The circuitry 202 may be further configured to control the group of UAVs 108 to move the group of UAVs at the multiple viewpoints in the 3D space 114. The circuitry 202 may further control the group of cameras (e.g., the first camera 112a and the second camera 112b) to acquire the group of images of the human subject 116 from the multiple viewpoints. In an embodiment, the set of anchor camera devices may include at least one camera (e.g., a first camera 502a (FIG. 5)) which may be mounted on or integrated with a UAV (such as, the first UAV 504a (FIG. 5)), and which may be configured to maintain a fixed pose while the group of UAVs (such as, a group of UAVs that may include the second UAV 504b and the third UAV 504c (FIG. 5)) is controlled to move relative to the fixed pose to acquire the group of images.

In an embodiment, the set of anchor camera devices may include at least one pre-calibrated camera (such as, the first anchor camera 402a (FIG. 4)) which may be fixed to a position in the 3D space 114, while the group of UAVs (a group of UAVs including, for e.g., the first UAV 406a and the second UAV 406b) is controlled to acquire the group of images. The set of anchor camera devices may include at least one pre-calibrated camera movably coupled to a remotely-controlled camera movement assembly. The circuitry 202 may be further configured to control the set of anchor camera devices in the 3D space 114 to acquire the set of anchor images.

The circuitry 202 may be configured to determine the first set of 2D positions of the human joints by application of a Machine Learning (ML) model (e.g., the ML model 104 (FIG. 1)) on each anchor image of the received set of anchor images. The ML model 104, as a human joint detection framework, may include a neural network trained on a 2D human joint detection task. The circuitry 202 may be further configured to determine the second set of 2D positions of the human joints by application of the ML model 104 on each image of the received group of images.

In an embodiment, the calibration of each UAV (e.g., the first UAV 406a and the second UAV 406b) may correspond to estimation of a 3D pose of the corresponding camera (e.g., the first camera 404a and the second camera 404b). The 3D pose may include a 3D position and an orientation of the corresponding camera in the 3D space 114.

In an embodiment, at least one UAV (e.g., the first UAV 406a (FIG. 4)) of the group of UAVs 406 may include a position sensor. Examples of the position sensor may include, but are not limited to, a Global Navigation Satellite System (GNSS) receiver, an Inertial Measurement Unit (IMU), a sensing camera, an Infra-red marker sensor, or a pattern code scanner. The circuitry 202 may be configured to calibrate each camera (e.g., the second camera 404b of FIG.

4) of the group of cameras further based on absolute position information acquired from the position sensor of the corresponding UAV (e.g., the first UAV 406a). In an embodiment, the circuitry 202 may be configured to calibrate each camera (e.g., the first camera 404a and the second camera 404b) of the group of cameras further based on values of intrinsic calibration parameters for the corresponding cameras.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. A system, comprising:
   circuitry communicatively coupled to a set of anchor camera devices and a group of cameras mounted on or integrated with a group of Unmanned Aerial Vehicles (UAVs), wherein the circuitry is configured to:
   receive, from the set of anchor camera devices, a set of anchor images of a human subject;
   receive, from the group of cameras, a group of images of the human subject from multiple viewpoints in three-dimensional (3D) space;
   determine, for the human subject in each anchor image of the received set of anchor images, a first set of two-dimensional (2D) positions of human joints;
   determine, for the human subject in each image of the received group of images, a second set of 2D positions of the human joints;
   compute, as 3D key-points, 3D positions of the human joints in the 3D space based on a triangulation using the determined first set of 2D positions of the human joints;
   determine a 2D re-projection error between the 3D key-points and the determined second set of 2D positions; and
   calibrate each camera of the group of cameras by minimizing the determined 2D re-projection error.

2. The system according to claim 1, wherein the 3D space is associated with one of: an outdoor space, an indoor space, or a studio-setup for volumetric capture.

3. The system according to claim 1, wherein the circuitry is further configured to:
   control the group of UAVs to move the group of UAVs at the multiple viewpoints in the 3D space; and
   control the group of cameras mounted on or integrated with the group of UAVs to acquire the group of images of the human subject from the multiple viewpoints.

4. The system according to claim 3, wherein the set of anchor camera devices comprises at least one camera which is mounted on or integrated with a UAV and which is configured to maintain a fixed pose while the group of cameras is controlled to move relative to the fixed pose to acquire the group of images.

5. The system according to claim 3, wherein the set of anchor camera devices comprises at least one pre-calibrated camera which is fixed to a position in the 3D space while the group of cameras is controlled to acquire the group of images.

6. The system according to claim 3, wherein the set of anchor camera devices comprises at least one pre-calibrated camera movably coupled to a remotely-controlled camera movement assembly.

7. The system according to claim 1, wherein the circuitry is further configured to control the set of anchor camera devices in the 3D space to acquire the set of anchor images.

8. The system according to claim 1, wherein the circuitry is configured to determine the first set of 2D positions of the human joints by application of a Machine Learning (ML) model on each anchor image of the received set of anchor images, and wherein the ML model, as a human joint detection framework, comprises a neural network trained on a 2D human joint detection task.

9. The system according to claim 1, wherein the circuitry is configured to determine the second set of 2D positions of the human joints by application of an ML model on each image of the received group of images, and wherein the ML model, as a human joint detection framework, comprises a neural network trained on a 2D human joint detection task.

10. The system according to claim 1, wherein
    the calibration of each cameras of the group of cameras corresponds to estimation of a 3D pose of the corresponding camera, and
    the 3D pose comprises a 3D position and an orientation of the corresponding camera in the 3D space.

11. The system according to claim 1, wherein
    at least one UAV of the group of UAVs comprises a position sensor, and
    the position sensor is one of: Global Navigation Satellite System (GNSS) receiver, an Inertial Measurement Unit (IMU), a sensing camera, an Infra-red marker sensor, or a pattern code scanner.

12. The system according to claim 11, wherein the circuitry is configured to calibrate each camera of the group of cameras further based on absolute position information acquired from the position sensor of a corresponding UAV.

13. The system according to claim 1, wherein the circuitry is configured to calibrate each camera of the group of cameras further based on values of intrinsic calibration parameters for the corresponding camera.

14. A method, comprising:
    receiving, from a set of anchor camera devices, a set of anchor images of a human subject;

receiving, from a group of cameras mounted on or integrated with a group of UAVs, a group of images of the human subject from multiple viewpoints in three-dimensional (3D) space;

determining, for the human subject in each anchor image of the received set of anchor images, a first set of two-dimensional (2D) positions of human joints;

determining, for the human subject in each image of the received group of images, a second set of 2D positions of the human joints;

computing, as 3D key-points, 3D positions of the human joints in the 3D space based on a triangulation using the determined first set of 2D positions of the human joints;

determining a 2D re-projection error between the 3D key-points and the determined second set of 2D positions; and calibrating each camera of the group of cameras by minimizing the determined 2D re-projection error.

15. The method according to claim 14, further comprising:

controlling the group of UAVs to move the group of UAVs at the multiple viewpoints in the 3D space; and controlling the group of cameras mounted on or integrated with the group of UAVs to acquire the group of images of the human subject from the multiple viewpoints.

16. The method according to claim 14, further comprising:

determining the first set of 2D positions of the human joints by application of a Machine Learning (ML) model on each anchor image of the received set of anchor images; and determining the second set of 2D positions of the human joints by application of the ML model on each image of the received group of images, and wherein the ML model, as a human joint detection framework, comprises a neural network trained on a 2D human joint detection task.

17. The method according to claim 14, wherein
the calibration of each camera corresponds to estimation of a 3D pose of the corresponding UAV, and
the 3D pose comprises a 3D position and an orientation of the corresponding UAV in the 3D space.

18. The method according to claim 14, wherein
at least one UAV of the group of UAVs comprises a position sensor, and
the position sensor is one of: Global Navigation Satellite System (GNSS) receiver, an Inertial Measurement Unit (IMU), a sensing camera, an Infra-red marker sensor, or a pattern code scanner.

19. The method according to claim 18, further comprising calibrating each UAV of the group of UAVs further based on absolute position information acquired from the position sensor of the corresponding camera-fitted UAV.

20. A non-transitory computer-readable medium having stored thereon computer implemented instructions that, when executed by a computer in a system, causes the system to execute operations, the operations comprising:

receiving, from a set of anchor camera devices, a set of anchor images of a human subject;

receiving, from a group of cameras mounted on or integrated with a group of UAVs, a group of images of the human subject from multiple viewpoints in three-dimensional (3D) space;

determining, for the human subject in each anchor image of the received set of anchor images, a first set of two-dimensional (2D) positions of human joints;

determining, for the human subject in each image of the received group of images, a second set of 2D positions of the human joints;

computing, as 3D key-points, 3D positions of the human joints in the 3D space based on a triangulation using the determined first set of 2D positions of the human joints;

determining a 2D re-projection error between the 3D key-points and the determined second set of 2D positions; and calibrating each camera of the group of cameras by minimizing the determined 2D re-projection error.

* * * * *